(12) United States Patent
Shinohara (10) Patent No.: US 10,864,862 B2
(45) Date of Patent: Dec. 15, 2020

(54) VEHICULAR INTERIOR TRIM

(71) Applicant: MORIROKU TECHNOLOGY COMPANY, LTD., Tokyo (JP)

(72) Inventor: Kenta Shinohara, Tokyo (JP)

(73) Assignee: MORIROKU TECHNOLOGY COMPANY, LTD., Tokyo (JP)

( * ) Notice: Subject to any disclaimer, the term of this patent is extended or adjusted under 35 U.S.C. 154(b) by 44 days.

(21) Appl. No.: 16/352,080

(22) Filed: Mar. 13, 2019

(65) Prior Publication Data

US 2019/0315290 A1    Oct. 17, 2019

(30) Foreign Application Priority Data

Apr. 16, 2018    (JP) ................. 2018-078237

(51) Int. Cl.
*B60R 13/02* (2006.01)
*F16B 21/08* (2006.01)

(52) U.S. Cl.
CPC ...... *B60R 13/0206* (2013.01); *B60R 13/0262* (2013.01); *F16B 21/08* (2013.01)

(58) Field of Classification Search
CPC ..... B60R 13/02; B60R 13/04; B60R 13/0206; B60R 13/0243; B60R 2013/0293; B60R 13/0256; B60R 2013/0287; B60R 13/025; B60R 2013/0281; F16B 5/0628; F16B 5/0657; F16B 11/006; F16B 19/002; F16B 19/02; F16B 21/075; F16B 21/20; F16B 2/241; F16B 3/00; F16B 5/00
USPC ........ 296/1.08, 70, 193.09, 210, 213, 146.2, 296/56, 39.1; 112/475.19, 202, 220, 112/475.18; 29/428, 453, 592, 525.01, 29/407.1

See application file for complete search history.

(56) References Cited

U.S. PATENT DOCUMENTS

| | | | |
|---|---|---|---|
| 8,955,896 B2* | 2/2015 | Baxter | B60R 13/04 296/1.08 |
| 2012/0068488 A1* | 3/2012 | Mourou | B60R 13/0206 296/1.08 |
| 2015/0375692 A1* | 12/2015 | Migaki | B60R 13/0243 296/1.08 |
| 2016/0167596 A1* | 6/2016 | Basquin | B60R 13/02 296/1.08 |

FOREIGN PATENT DOCUMENTS

| | | |
|---|---|---|
| JP | 60-125789 | 8/1985 |
| JP | 63-75615 | 5/1988 |

(Continued)

OTHER PUBLICATIONS

Japanese Office Action (Notice of Reasons for Refusal) dated Mar. 23, 2020, English translation included, 9 pages.

*Primary Examiner* — D Glenn Dayoan
*Assistant Examiner* — Sunsurraye Westbrook
(74) *Attorney, Agent, or Firm* — Rankin, Hill & Clark LLP (57) ABSTRACT

A vehicular interior trim includes: an interior trim member provided with an engagement hole; and an elastic member attached to a surface of the interior trim member and including a protrusion provided on a back surface and to be inserted in the engagement hole. The protrusion includes an engagement piece to be engaged with an external edge of the engagement hole, and the interior trim member includes a recess that surrounds an internal edge of the engagement hole.

8 Claims, 9 Drawing Sheets

(56) References Cited

FOREIGN PATENT DOCUMENTS

| | | |
|---|---|---|
| JP | 2009-061959 | 3/2009 |
| JP | 2009-281431 | 12/2009 |
| JP | 2013-110357 | 6/2013 |

* cited by examiner

VEHICULAR INTERIOR TRIM

FIELD OF THE INVENTION

The present disclosure relates to a vehicular interior trim that includes an interior trim member, and an elastic member attached to one surface of this interior trim member.

BACKGROUND

The vehicle compartment of a vehicle like an automobile is trimmed by an interior trim (hereinafter, a vehicular interior trim). An example vehicular interior trim is disclosed in, for example, JP 2009-61959A.

The vehicular interior trim disclosed in JP 2009-61959A includes a storage tray provided on an instrument panel, and an elastic mat laid on the bottom of this storage tray.

Engagement holes are formed in the bottom of the storage tray, and the elastic mat includes engagement protrusions which are formed on the back surface (rear surface) and which are to be engaged with the respective engagement holes. The engagement protrusions are inserted in and engaged with the respective engagement holes, thereby preventing the elastic mat from being uplifted and from being displaced laterally.

Most storage trays are resin-molded members. When a melted resin is cured in a cavity within a mold, the resin-molded member inevitably shrinks. The cavity has a shape and a dimension which have such a shrinkage taken into consideration.

However, the thickness of the storage tray varies due to an adverse effect originating from a change in various conditions. Example various conditions are, for example, the temperature of a mold and an injection pressure of a resin material.

When the bottom of the storage tray is formed so as to be thicker than a prescribed dimension, insertion of the engagement protrusion becomes insufficient, and thus an improper engagement occurs.

Moreover, when the bottom of the storage tray is formed so as to be thinner than the prescribed dimension, insertion of the engagement protrusion becomes excessive, and thus an insufficient engagement occurs.

When a devisal for correcting the thickness of the storage tray is adopted, costs for the correction increase, affecting the production costs of the storage tray.

Most elastic mats are also molded members formed of a soft resin. A certain variability occurs in the length of the engagement protrusion. Even if the bottom of the storage tray has a predetermined thickness, when the engagement protrusion is too short, improper engagement occurs, and when the engagement protrusion is too long, insufficient engagement occurs.

When a devisal for correcting the elastic mat is adopted, costs for the correction increase, affecting the production costs of the elastic mat.

For the purpose of generalized expression, the storage tray is read as an "interior trim member", the elastic mat is read as an "elastic member", and an assembly of the storage tray and the elastic mat is read as a "vehicular interior trim".

Under a demand for cost reduction with respect to vehicles, a vehicular interior trim is desired which suppresses production costs and which achieves a proper engagement.

SUMMARY OF THE INVENTION

An objective of the present disclosure is to provide a vehicular interior trim which suppresses production costs and which achieves a proper engagement of an elastic member with an interior trim member.

A first embodiment according to the present disclosure provides a vehicular interior trim that includes:
- an interior trim member provided with an engagement hole; and
- an elastic member attached to a surface of the interior trim member and including a protrusion provided on a back surface and to be inserted in the engagement hole,
- wherein the protrusion includes an engagement piece to be engaged with an external edge of the engagement hole, and
- wherein the interior trim member includes a recess that surrounds an internal edge of the engagement hole.

According to the present disclosure, the interior trim member includes the recess that surrounds the internal edge of the engagement hole.

The elastic member can be pushed extra within the range of the depth of the recess. This causes the protrusion to be inserted in the engagement hole by over-stroke.

If the interior trim member is formed so as to be thicker than a prescribed dimension, such an over-stroke causes the engagement piece at the tip of the protrusion to surely pass completely through the engagement hole.

When pushing force is reduced after passing completely through, the elastic member causes a spring-back, and thus the engagement piece returns. During the return, the engagement piece abuts and is stopped by the outer edge of the engagement hole.

If the interior trim member is formed so as to be thinner than the prescribed dimension, the spring-back of the elastic member causes the engagement piece to abut the external edge of the engagement hole.

Since the recess can be formed simultaneously with the production of the interior trim member (or the elastic member), the formation of the recess does not increase the production costs.

Therefore, according to the present disclosure, a vehicular interior trim which suppresses production costs and which achieves a proper engagement of the elastic member with the interior trim member can be provided.

Moreover, the present disclosure is suitable for a work that is difficult to confirm an engagement at a back side. The reason will be descried. For example, when the elastic member is attached to the front surface of the interior trim member, by visually checking the back side of the interior trim member, it can be confirmed whether or not the engagement piece of the elastic member is properly engaged with the engagement hole of the interior trim member. However, because of, for example, a constraint in work time, it is difficult in some cases to check the engagement at the back side. According to the present disclosure, even if the thickness of the interior trim member has a difference from the prescribed dimension, since the engagement piece can be surely engaged with the engagement hole, a confirmation at the back side can be eliminated.

A second embodiment of the present disclosure provides a vehicular interior trim that includes:
- an interior trim member provided with an engagement hole; and
- an elastic member attached to a surface of the interior trim member and including a protrusion provided on a back surface and to be inserted in the engagement hole,
- wherein the protrusion includes an engagement piece to be engaged with an external edge of the engagement hole, and wherein the elastic member includes a recess provided on a back surface and surrounding the protrusion.

According to the present disclosure, the elastic member includes the recess which is provided on the back surface and which surrounds the protrusion.

Hence, the second embodiment can accomplish the same advantageous action and effect as those of the first embodiment as described above.

Preferably, a depth of the recess is, when a thickness of the elastic member is defined as 1, within a range between 0.16 and 0.4.

When the depth is smaller than 0.16, the depth of the recess becomes insufficient, and a case in which the engagement piece does not pass completely through the engagement hole and remains therein occurs at a certain frequency. The depth of the recess is sufficient if it is equal to or greater than 0.16.

Moreover, when the depth exceeds 0.4, the thickness of the interior trim member around the engagement hole becomes less than 60%, causing a reduction in strength. Moreover, since the axial length of the engagement hole becomes less than 60%, the engagement piece immediately passes completely through, and a click feeling cannot be obtained (or becomes quite small even if the click feeling is obtained). When the click feeling is not obtained or is small, an assembly worker cannot obtain a feeling of the completion of assembly work, affecting the assembling work.

By managing the depth of the recess within a proper range, a workability is enhanced while addressing an improper engagement.

Preferably, an engagement amount is defined as a value obtained by subtracting a radius of the engagement hole from a distance from an axial center of the protrusion to a tip of the engagement piece, and the engagement piece employs a structure deflectable by at least twice as much as the engagement amount.

When the diameter of the engagement hole and the diameter of the engagement piece have variabilities, such variabilities can be eliminated. Moreover, repulsive force at the time of assembling increases, and a click feeling when the engagement piece passes through the external edge of the engagement hole is further obtainable.

Preferably, the engagement hole and the protrusion are formed in a semi-circular shape.

When the protrusion is formed in a true-circular shape, two sliding molds are necessary, increasing the production costs. When the engagement piece is formed in a rectangular shape, a single sliding mold is sufficient but because the circumferential length of the engagement piece increases, a designing of the sliding mold becomes difficult.

In contrast, like the present disclosure, when the protrusion is formed in a semi-circular shape, a single sliding mold is sufficient and the circumferential length of the engagement piece is reduced, facilitating a designing of the sliding mold.

BRIEF DESCRIPTION OF THE DRAWINGS

Several preferable embodiments of the present disclosure will be described in detail with reference to accompanying figures in which.

DETAILED DESCRIPTION OF THE EMBODIMENTS

Embodiments of the present disclosure will be described below with reference to the accompanying figures.

In order to facilitate understanding to the present disclosure, specific examples in which an interior trim member is a shifter panel that forms a part of a center console and an elastic member is an elastic mat on which a portable terminal is placed will be described below.

However, the interior trim member and elastic member according to the present disclosure are not limited to these specific examples.

Moreover, directions indicated in the figures are defined with reference to a driver who sits down a driver's seat.

Figure 1:
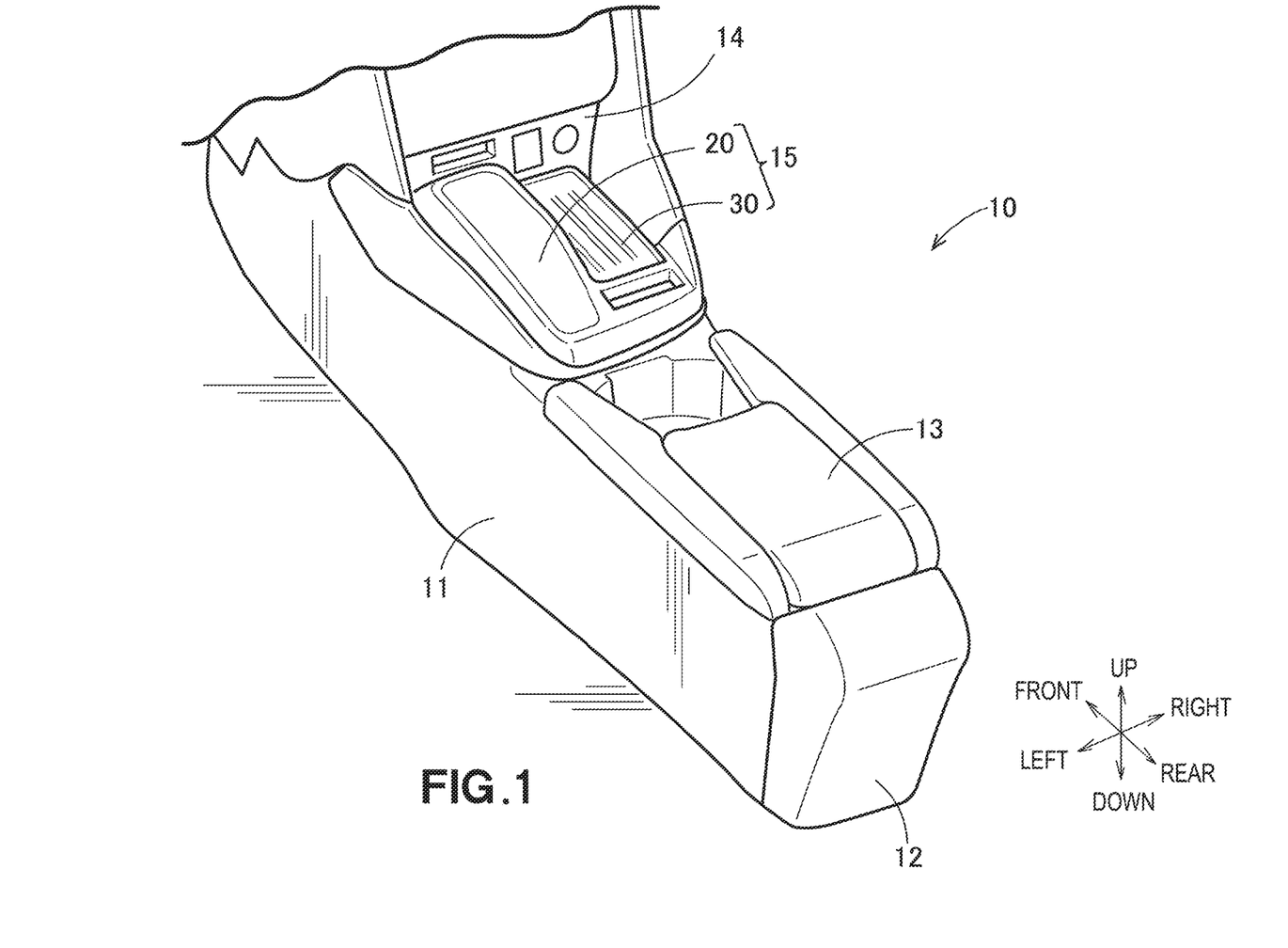
FIG. 1 is a perspective view of a center console that includes a vehicular interior trim according to the present disclosure.

As illustrated in FIG. 1, a center console 10 is provided between the driver's seat of a vehicle like an automobile and a passenger seat thereof. The center console 10 includes side panels 11, a rear panel 12, an arm rest 13, and a shifter panel 20.

The side panels 11 extend in a vehicular lengthwise direction along the passenger seat (or the driver's seat).

The rear panel 12 connects a rear end of the left side panel 11 and a rear end of the right side panel 11 with each other.

The arm rest 13 is mounted on the rear-half parts of the side panels 11 and an upper edge of the rear panel 12, and supports an elbow of a person.

The shifter panel 20 is placed between the arm rest 13 and a front jack panel 14.

An elastic mat 30 is partially mounted on the shifter panel 20. A thin and elongated rectangular portable terminal can be placed on this elastic mat 30. Since the elastic mat 30 deforms elastically, force to be applied to the personal terminal is reduced. Since a surface of the elastic mat 30 has a larger friction coefficient than that of a general-purpose resin, even if inertia force is applied to a portable terminal, the portable terminal does not sideslip over the elastic mat 30.

Figure 2:
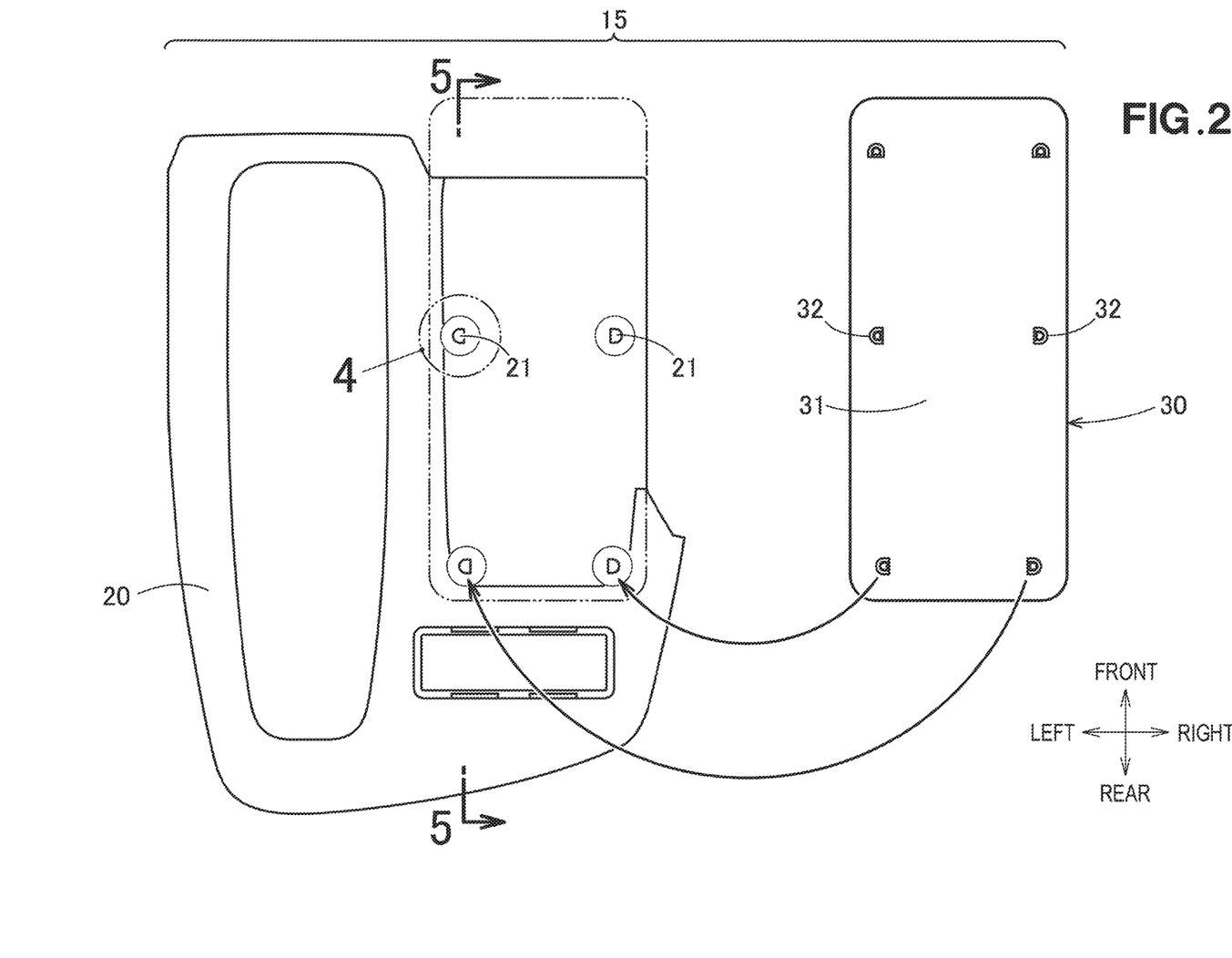
FIG. 2 is an exploded view of the vehicular interior trim according to the present disclosure.

As illustrated in FIG. 2, a vehicular interior trim 15 according to the present disclosure includes the shifter panel 20 that is the interior trim member, and the elastic mat 30 that is the elastic member attached to a surface (upper surface) of this shifter panel 20.

The shifter panel 20 is a resin-molded member formed of, for example, a polypropylene (PP) material.

Moreover, the elastic mat 30 is a resin-molded member formed of, for example, an olefin-based thermoplastic elastomer (TPO). Since the elastomer has similar characteristics to these of rubber, the elastic mat 30 has characteristics such that it is likely to be deformed, and returns to the original shape after the deformation.

In FIG. 2, for the purpose of description, the elastic mat 30 is detached from the shifter panel 20, and the elastic mat 30 is turned over. Semi-circular engagement holes 21 are formed in the shifter panel 20. Semi-circular protrusions 32 to be engaged with the respective engagement holes 21 are provided on a back surface 31 of the elastic mat 30.

With reference to FIGS. 3A to 3E, and FIG. 4, details of the protrusions 32, and details of the engagement hole 21 will be described.

Figure 3A:
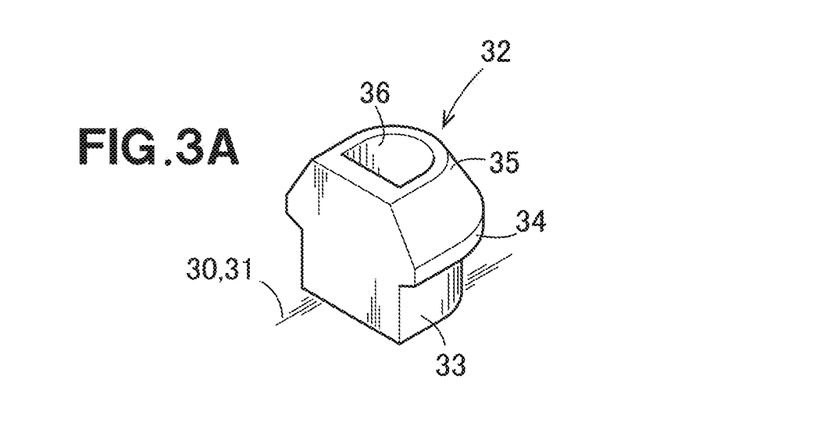
FIG. 3A is a perspective view of a protrusion.
Figure 3B:
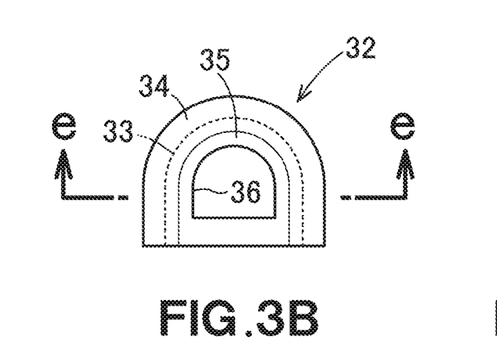
FIG. 3B is a plan view of the protrusion.
Figure 3C:
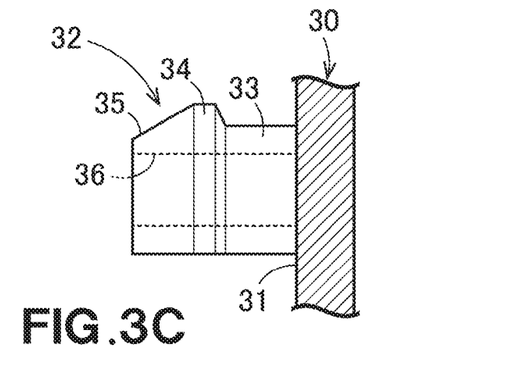
FIG. 3C is a right side view of the protrusion.
Figure 3D:
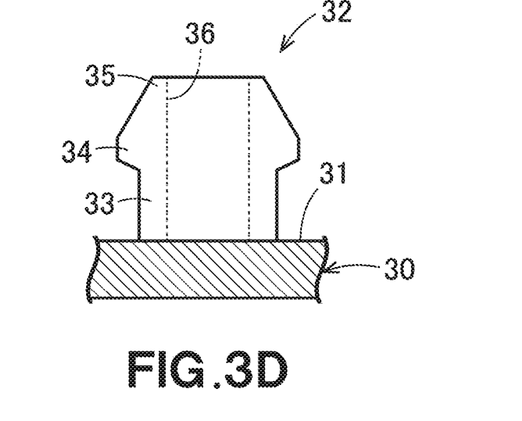
FIG. 3D is a back side view of the protrusion.
Figure 3E:
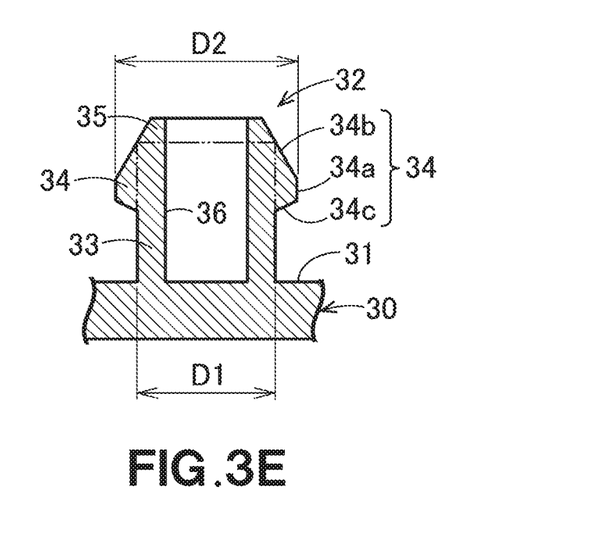
FIG. 3E is a cross-sectional view taken along a line e-e in FIG. 3B.

As illustrated in FIG. 3E, each protrusion 32 includes a hollow columnar portion 33 which extends from the back surface 31 and which has a uniform planar cross-section, an engagement piece 34 which projects horizontally from the upper part of the hollow columnar portion 33 with a greater outer diameter D2 than an outer diameter D1 of the hollow columnar portion 33, and a tapered portion 35 that extends from the tip of the hollow columnar portion 33 at a smaller outer diameter than the outer diameter D1 of the hollow columnar portion 33.

Moreover, the engagement piece 34 includes an outer circumference surface 34a that has the outer diameter which is D2, a tapered tip surface 34b that decreases the diameter from the upper end of this outer circumference surface 34a toward the tapered portion 35, and a tapered base surface 34c that decreases the diameter toward the hollow columnar portion 33 from the lower end of the outer circumference surface 34a.

As illustrated in FIG. 3B, the protrusion 32 includes a semi-circular hollow part 36, and the hollow columnar portion 33, the engagement piece 34, and the tapered portion 35 are thickened so as to surround this hollow part 36, thus being formed in a semi-circular shape as a whole.

Figure 4:
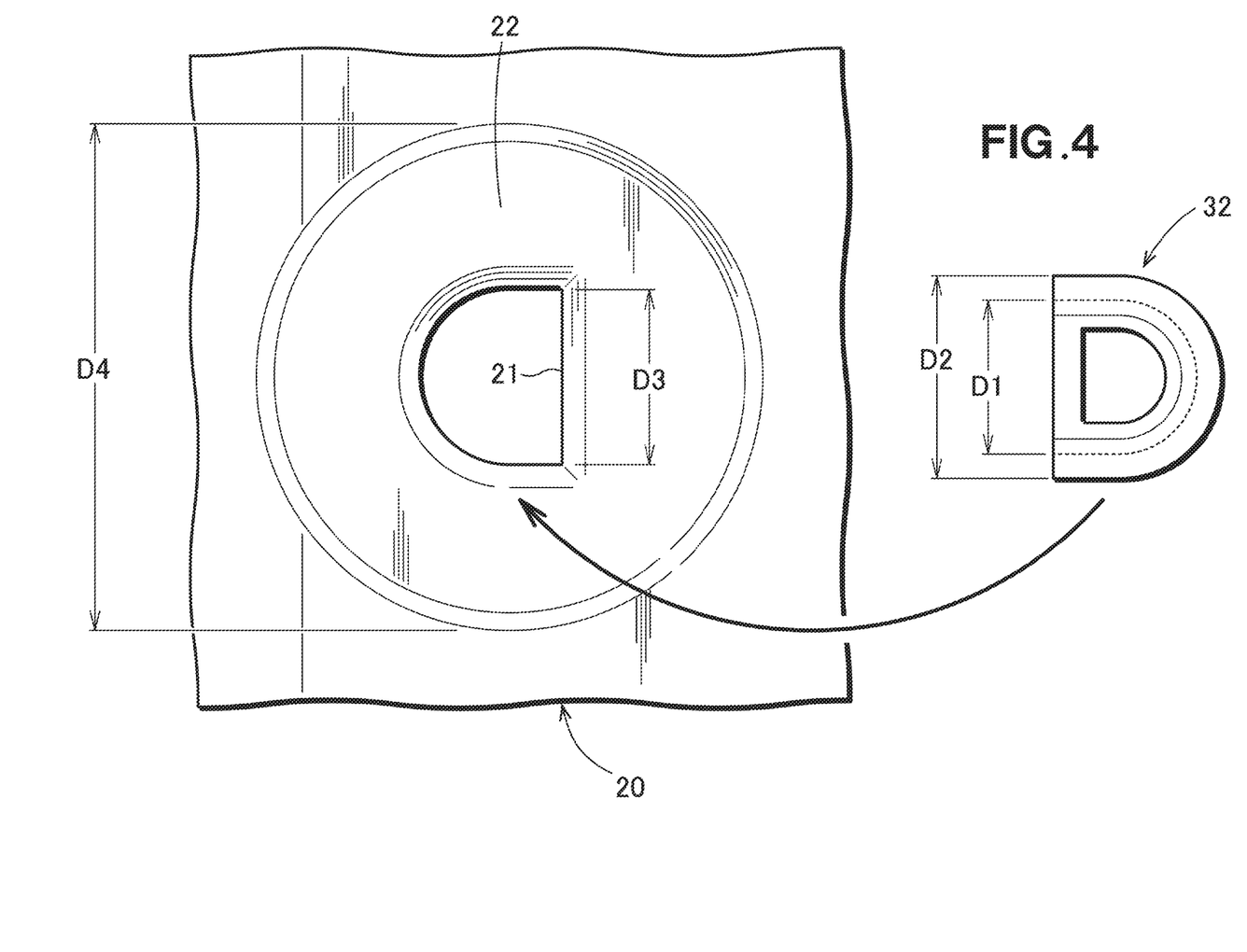
FIG. 4 is an enlarged view of a part 4 in FIG. 2.

As illustrated in FIG. 4, the shifter panel 20 includes the engagement holes 21 and recesses 22 surrounding the respective engagement holes 21. A representative diameter D3 of the engagement hole 21 is set to be larger than the diameter D1 of the protrusion 32, and smaller than the diameter D2.

Although a diameter D4 of each recess 22 is optional, a diameter that is three to four times as much as D3 is appropriate.

Although the shape of the recess 22 in a planar view may be, in addition to a circular shape, an elliptical shape, a rectangular shape, or a polygonal shape, a circular shape that facilitates the elastic mat 30 to be deformed uniformly and stroked uniformly is suitable.

Each engagement hole 21 formed in the shifter panel 20 is also formed in a semi-circular shape as a whole. The semi-circular protrusions 32 are fitted in the respective semi-circular engagement holes 21 as indicated by an arrow, and are engaged therewith. This procedure will be described later.

Figure 5:
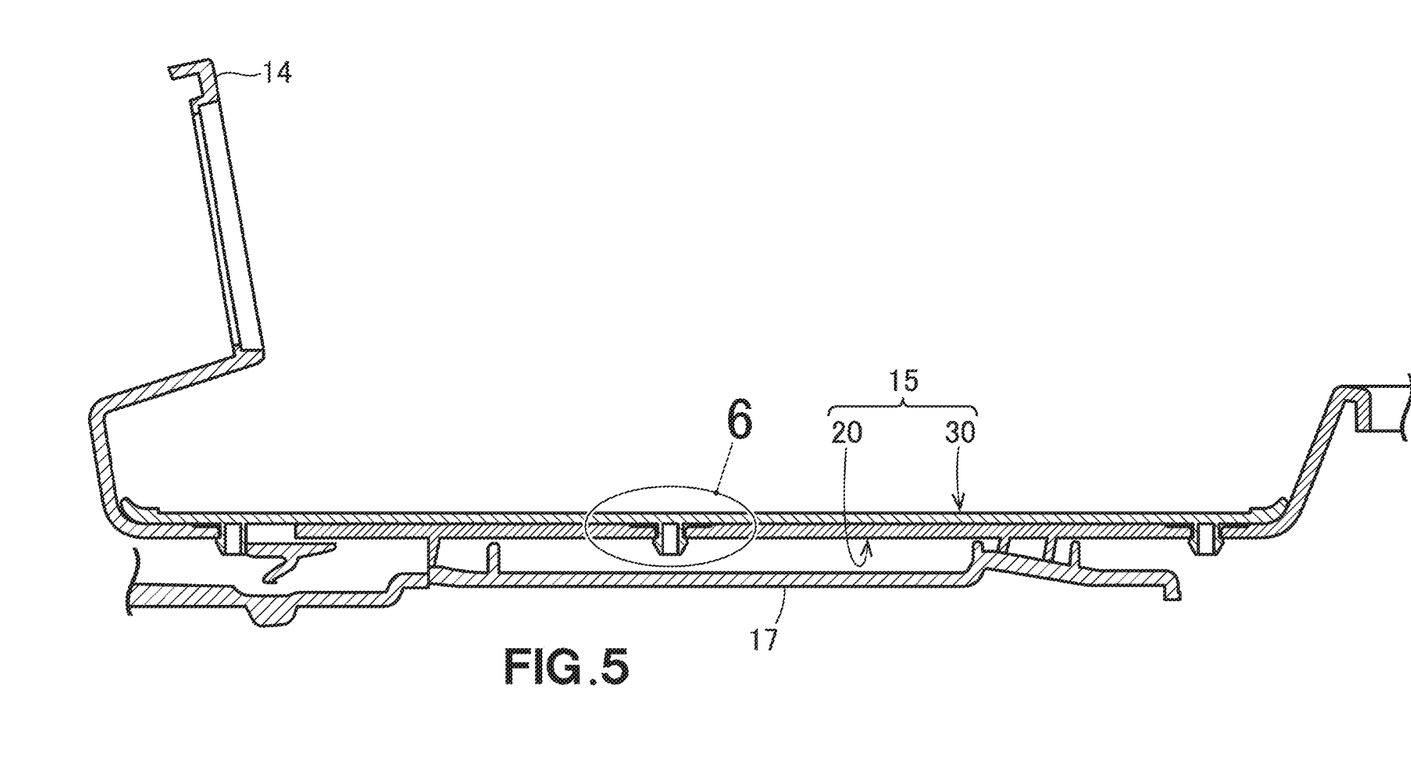
FIG. 5 is a cross-sectional view taken along a line 5-5 in FIG. 2.

As illustrated in FIG. 5, the vehicular interior trim 15 includes the shifter panel 20 that is the interior trim member, and the elastic mat 30 that is the elastic member attached to one surface (upper surface) of this shifter panel 20. The shifter panel 20 is supported by a base plate 17 provided below.

Figure 6:
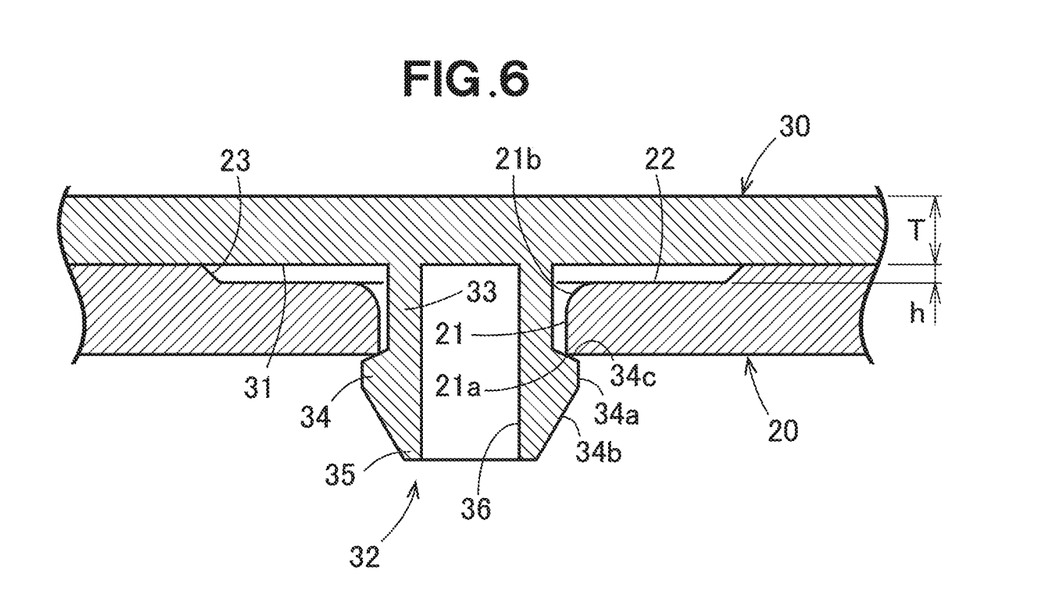
FIG. 6 is an enlarged view of a part 6 in FIG. 5.

As illustrated in FIG. 6, when the tapered base surface 34c of the protrusion 32 abuts an external edge 21a of the engagement hole 21, the elastic mat 30 is fastened to the shifter panel 20.

Each recess 22 is provided in the shifter panel 20 at a region that surrounds an internal edge 21b of the engagement hole 21. Note that the recess 22 is connected to a general surface of the shifter panel 20 by an inclined curved surface 23 (or an inclined surface). The inclined curved surface 23 (or the inclined surface) addresses a sudden change in the cross-section of the shifter panel 20.

When a thickness T of the elastic mat 30 is defined as 1, a depth h of the recess 22 is set to be within a range between 0.16 to 0.4. The reason will be described later.

Procedures of inserting the protrusions 32 in the respective engagement holes 21, and causing those to be caught by the respective engagement holes will be described with reference to FIGS. 7A to 7C.

Figure 7A:
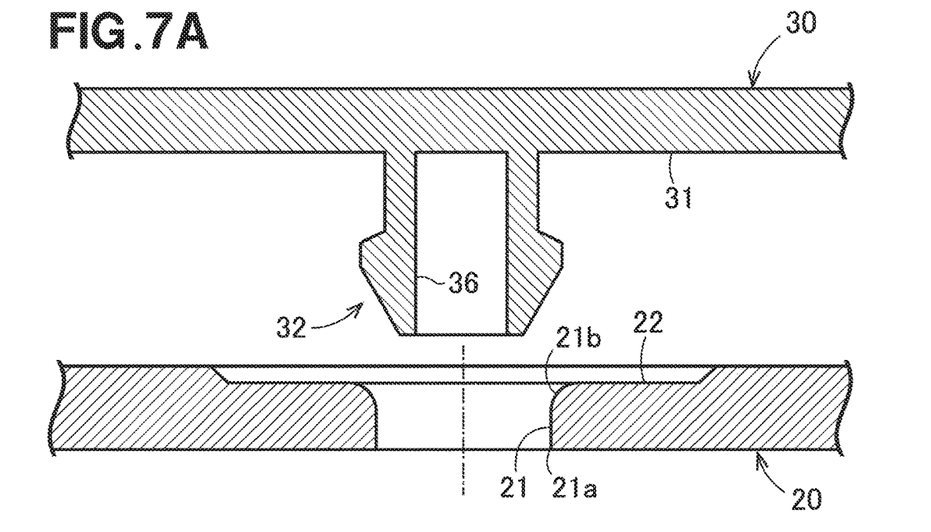
FIGS. 7A, 7B, and 7C are diagrams for explaining a procedure of attaching an elastic mat to a shifter panel.

As illustrated in FIG. 7A, the protrusion 32 is caused to face the engagement hole 21, and the elastic mat 30 is moved down.

Figure 7B:
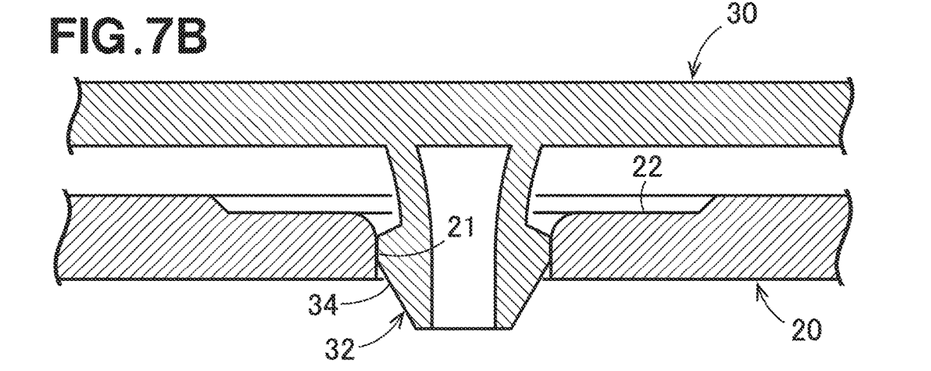

As illustrated in FIG. 7B, the engagement piece 34 of the protrusion 32 decreases the diameter by being depressed against a wall of the engagement hole 21. The elastic mat 30 is further moved down.

Figure 7C:
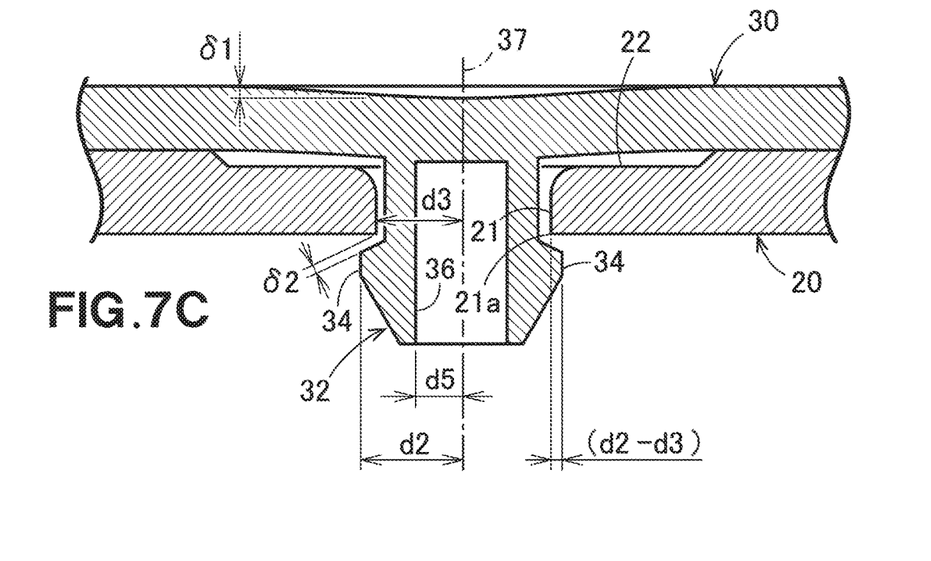

As illustrated in FIG. 7C, the elastic mat 30 goes down by $\delta 1$ relative to the recess 22. In this case, the engagement piece 34 passes completely through the engagement hole 21. At a moment at which the engagement piece 34 passes completely through, the engagement piece returns to the original diameter, and a click feeling "clicking" is transmitted to a hand of an assembly worker at this time. The assembly worker is thus capable of recognizing that attachment is completed by this click feeling Moreover, the engagement piece 34 protrudes from the external edge 21a of the engagement hole 21 by $\delta 2$. That is, the engagement piece 34 is over-stroked.

When downward force applied to the elastic mat 30 is canceled, according to a spring-back action, $\delta 1$ attempts to return to 0, and $\delta 2$ becomes 0.

Consequently, a form illustrated in FIG. 6 is achieved.

In FIG. 7C, with reference to an axial center 37 of the protrusion 32, when a radius of the engagement hole 21 is defined as d3, a radius of the engagement piece 34 is defined as d2, and a radius of the hollow portion 36 is defined as d5, an engagement amount of the engagement piece 34 becomes (d2-d3). The radius d2 corresponds to a distance from the axial center 37 to a tip of the engagement piece 34.

As illustrated in FIG. 7B, the engagement piece 34 is displaced toward the axial center 37 by at least the engagement amount. If the radius d5 of the hollow portion 36 is insufficient, this displacement cannot be eliminated. In addition, the engagement hole 21 and the protrusion 32 involve production errors.

In order to address these technical problems, the radius d5 of the hollow portion 36 is set so as to exceed the twice of the engagement amount (d2-d3). This eliminates both the displacement of the engagement piece 34 and the production errors, and thus the protrusion 32 can be smoothly inserted in the engagement hole 21.

As described above, the present disclosure utilizes an over-stroke and a spring-back.

In FIG. 7C, if the protrusion 32 is made shorter than a prescribed dimension, or the shifter panel 20 is formed thicker than a prescribed dimension because of the production errors, according to conventional technologies, as illustrated in FIG. 7B, the engagement piece 34 remains in the engagement hole 21, causing an improper attachment, but according to the present disclosure, a form illustrated in FIG. 7C is achieved by the over-stroke, avoiding an improper attachment.

Next, tests regarding the depth (see FIG. 6, reference sign h) of the recess 22 were carried out.

Test Conditions:
Material of shifter panel: PP
Thickness of shifter panel: 2.5 mm
Depth h of recess: (six kinds) 0.3 mm, 0.4 mm, 0.5 mm, 0.75 mm, 1.0 mm, and 1.25 mm
Material of elastic mat: TPO
Thickness of elastic mat: 2.0 mm
Outer diameter of hollow columnar portion of protrusion: 4.5 mm According to such tests, it was confirmed whether or not the protrusion passed completely through the engagement hole and a click feeling was obtained.

First Test: Depth h of Recess: 0.3 mm

According to the first test, the protrusion did not pass completely through. Since the protrusion did not pass completely through, a click feeling was not obtained. Because the recess was too shallow and a sufficient over-stroke was not obtainable, an evaluation was made as No Good (NG). A term (h/thickness of shifter panel) was 0.12 by a calculation of 0.3/2.5.

Second Test: Depth h of Recess: 0.4 mm

According to the second test, since a click feeling was obtained and the protrusion passed completely through, an evaluation was made as Good (G). The term (h/thickness of shifter panel) was 0.16 by a calculation of 0.4/2.5.

Third, Fourth and Fifth Tests: Depth h of Recess: 0.5 mm, 0.75 Mm and 1.0 mm in the Third, Fourth and Fifth Tests, Respectively.

According to the third, fourth and fifth tests, since a click feeling was obtained and the protrusion passed completely through, evaluations were made as Good (G). The term (h/thickness of shifter panel) was 0.20, 0.30 and 0.40 according to the third, fourth, and fifth tests, respectively Sixth Test: Depth h of Recess: 1.25 mm According to the sixth test, the protrusion passed completely through within a short time in comparison with other tests. Possibly because of this reason, a click feeling was hardly obtained. The engagement hole had a length that was 1.25 mm (a depth 2.5 mm of the shifter panel—a thickness 1.25 mm of the recess), and the protrusion passed completely through within a short time. An evaluation was made as No Good (NG). The term (h/thickness of shifter panel) was 0.50.

It is assumed that a click feeling was not obtainable since an accumulation of elastic energy was insufficient because the time was short, and repulsive energy was small.

Moreover, a strength becomes a technical problem because axial force by the engagement piece was applied to the circumference of the engagement hole.

That is, although the shifter panel that had a thickness of 2.5 mm was provided with the recess that had a depth h, the greater the depth h becomes, the thinner the shifter panel becomes, and thus an insufficiency in strength occurs. According to the sixth test, the remaining thickness became the minimum, and a reduction in the strength is the largest.

In view of whether or not the protrusion passed completely through, whether or not a click feeling was obtained, and the strength of the shifter panel, the first test and the sixth test were evaluated as "NG", while the second to fifth tests were evaluated as "G".

When the term (h/thickness of shifter panel) was within a range between 0.16 to 0.40, the protrusion surely passes completely through, a sufficient click feeling is obtainable, and the strength of the shifter panel is secured.

Next, modified examples will be described.

Figure 8A:
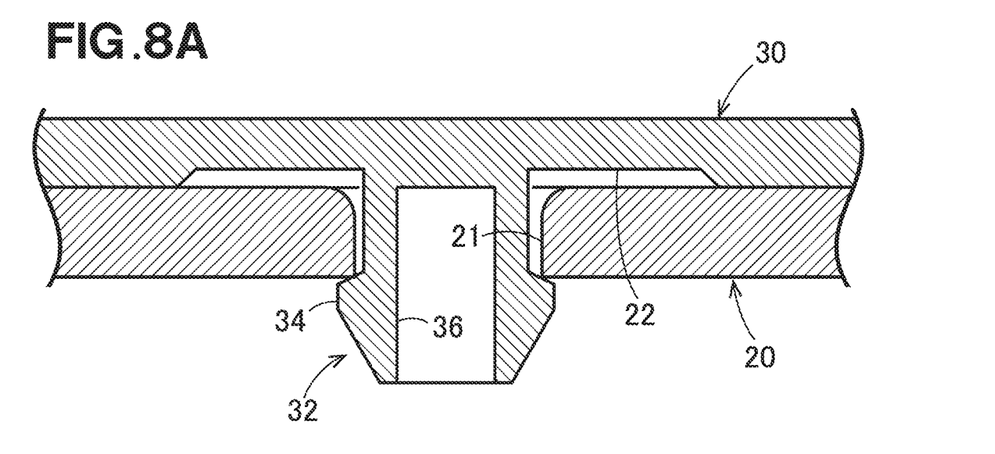
FIGS. 8A and 8B are diagrams illustrating a modified example of a vehicular interior trim according to the present disclosure.

As illustrated in FIG. 8A, the recess 22 may be provided in the elastic mat 30 so as to surround the protrusion 32. This structure also achieves desired over-stroke and spring-back.

Figure 8B:
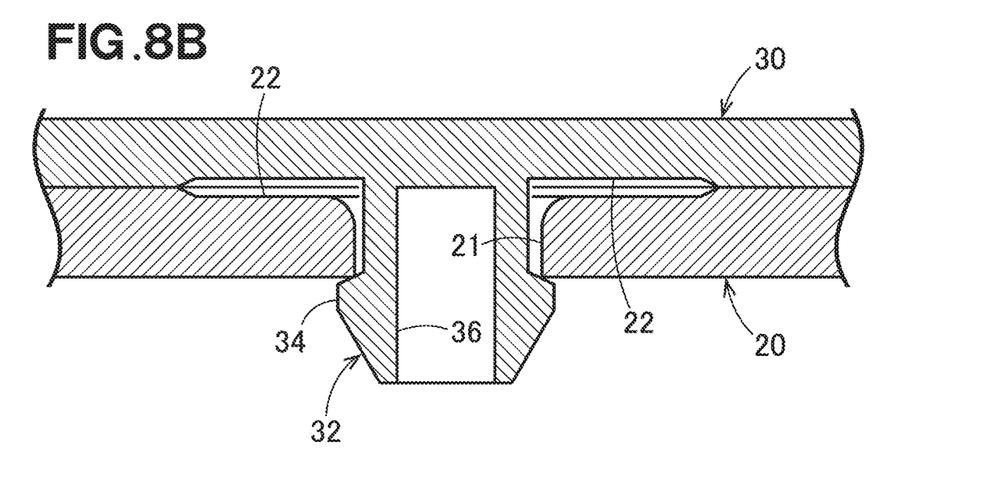

Alternatively, as illustrated in FIG. 8B, the recesses 22 may be provided in both the shifter panel 20 and the elastic mat 30. Because it is sufficient if the depth of the recess 22 is a half of h per each recess, a reduction in the strength of the shifter panel 20 and a reduction in the strength of the elastic mat 30 are suppressed.

Next, with reference to FIGS. 9A to 9C, a shape of the protrusion 32 according to the present disclosure will be described.

Figure 9A:
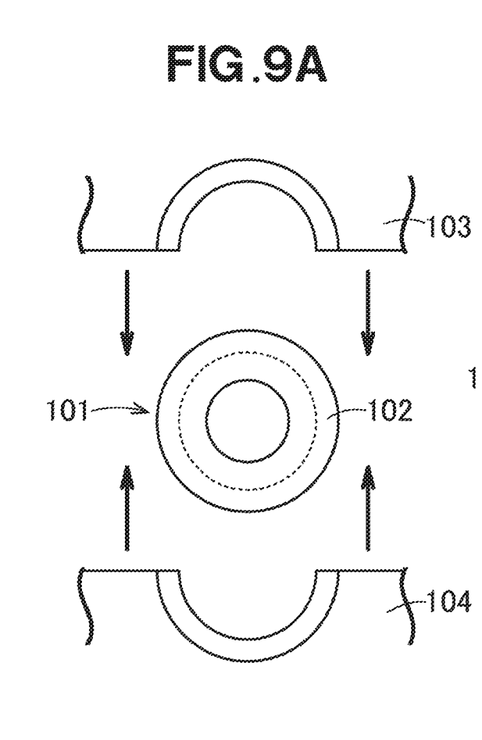
FIGS. 9A, 9B, and 9C are diagrams for comparing a comparative example with an embodiment regarding the shape of an engagement piece.

A protrusion 101 in FIG. 9A that illustrates a comparative example is formed in a circular shape and such a protrusion 101 is often utilized. An engagement piece 102 is in a ring shape.

One sliding mold 103 serves for such a protrusion by 180 degrees, and another sliding mold 104 serves for such a protrusion by remaining 180 degrees. The two sliding molds 103 and 104 are joined in accordance with arrows when resin-molding is carried out, and after a resin is cured, the molds are separated in the direction opposite to those arrows.

Since the two sliding molds 103 and 104 are necessary, costs for two molds are necessary.

Figure 9B:
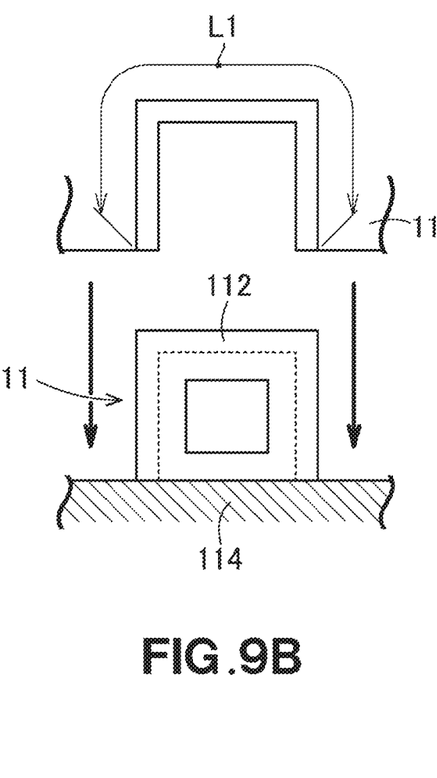

A protrusion 111 in FIG. 9B that illustrates another comparative example is formed in a rectangular shape. An engagement piece 112 is in a rectangular shape. By butting one sliding mold 113 against a master mold 114, resin molding is enabled. The costs for the mold is thus reduced.

However, since the protrusion is in a rectangular shape, a circumferential length L1 of the engagement piece 112 becomes inevitably long, and a designing of the sliding mold 113 is complicated.

Figure 9C:
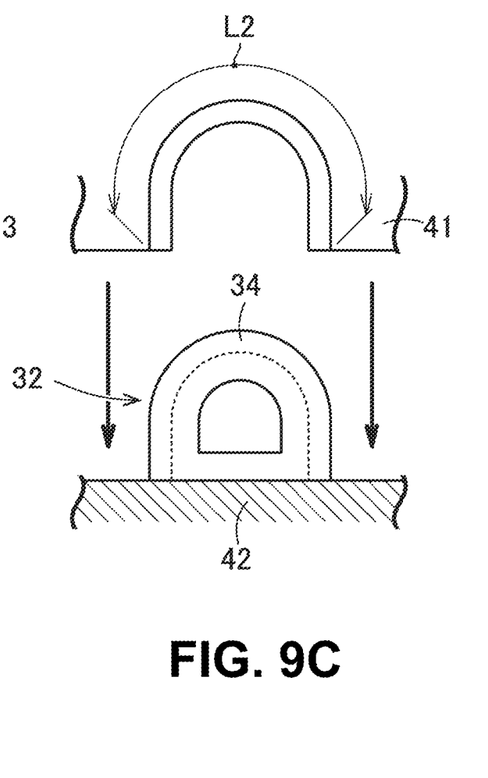

In contrast, the protrusion 32 in FIG. 9C that illustrates the embodiment is formed in a semi-circular shape. The engagement piece 34 is in a semi-circular shape. By butting one sliding mold 41 against a master mold 42, resin molding is enabled. The costs for the mold is thus reduced.

The semi-circular shape in comparison with a rectangular shape has a shorter circumferential length L2 of the engagement piece 34, facilitating a designing of the sliding mold 41. Therefore, the semi-circular protrusion 32 is suitable in view of the foregoing.

However, regarding the protrusion 32 of the present disclosure, the shapes in FIGS. 9A and 9B are not excluded.

Although the number and locations of the protrusions 32 are optional, it is preferable if such protrusions are placed so as to form a pair. In that case, it is preferable if the pair of protrusions is placed in such a way that respective planes of the semi-circular shapes face with each other.

Note that the vehicular interior trim according to the present disclosure is not limited to the shifter panel of the center console, and the kind is not limited as long as it is a vehicular interior trim. The elastic member is not limited to the elastic mat.

The present disclosure is suitable for a shifter panel of a center console.

What is claimed is:
1. A vehicular interior trim comprising:
    an interior trim member having a surface that defines an engagement hole; and
    an elastic member that is attached to the surface of the interior trim member, said elastic member comprising a protrusion extending from a back surface thereof, said protrusion being received in the engagement hole, wherein the protrusion is hollow and comprises an engagement piece at a free end thereof, said protrusion engagement piece is engaged with an external edge of the interior trim member that surrounds the engagement hole, and wherein the interior trim member surface has a recess formed therein that surrounds an internal edge of the engagement hole, said recess allowing a portion of the elastic member to be deformed toward the interior trim member as the protrusion is being inserted into the engagement hole.

2. A vehicular interior trim comprising:

an interior trim member having a surface that defines an engagement hole; and an elastic member that is attached to the surface of the interior trim member, said elastic member comprising a protrusion extending from a back surface thereof, said protrusion being received in the engagement hole, wherein the protrusion is hollow and comprises an engagement piece at a free end thereof, said protrusion engagement piece is engaged with an external edge of the interior trim member that surrounds the engagement hole, and wherein the back surface of the elastic member defines a recess that surrounds the protrusion, said recess allowing the elastic member to be deformed toward the interior trim member as the protrusion is inserted into the engagement hole.

3. The vehicular interior trim according to claim 1, wherein a depth of the recess is, when a thickness of the elastic member is defined as 1, within a range between 0.16 and 0.4.

4. The vehicular interior trim according to claim 2, wherein a depth of the recess is, when a thickness of the elastic member is defined as 1, within a range between 0.16 and 0.4.

5. The vehicular interior trim according to claim 1,
wherein an engagement amount is defined as a value obtained by subtracting a radius of the engagement hole from a distance from an axial center of the protrusion to a tip of the engagement piece, and
wherein the engagement piece employs a structure deflectable by at least twice as much as the engagement amount.

6. The vehicular interior trim according to claim 2,
wherein an engagement amount is defined as a value obtained by subtracting a radius of the engagement hole from a distance from an axial center of the protrusion to a tip of the engagement piece, and
wherein the engagement piece employs a structure deflectable by at least twice as much as the engagement amount.

7. The vehicular interior trim according to claim 1, wherein the engagement hole and the protrusion are formed in a semi-circular shape.

8. The vehicular interior trim according to claim 2, wherein the engagement hole and the protrusion are formed in a semi-circular shape.

* * * * *